United States Patent [19]

Brown

[11] Patent Number: 5,274,238

[45] Date of Patent: Dec. 28, 1993

[54] RADIATION DETECTOR DIRECTION

[76] Inventor: Glen A. Brown, c/o Pier Research, P.O. Box 1153, Dartmouth, Nova Scotia, Canada, B2Y 4B8

[21] Appl. No.: 868,395

[22] Filed: Apr. 14, 1992

Related U.S. Application Data

[63] Continuation of Ser. No. 643,234, Jan. 22, 1991, abandoned.

[51] Int. Cl.$^5$ .............................................. G01T 1/16
[52] U.S. Cl. ................................. 250/394; 250/515.1
[58] Field of Search ............... 250/394, 253, 515.1, 250/370.01

[56] References Cited

U.S. PATENT DOCUMENTS 3,436,539  4/1969  Wilcox .................... 250/394
3,539,806  11/1970  Humphrey .............. 250/394
3,581,090  5/1971  Brown .................... 250/394

Primary Examiner—Paul M. Dzierzynski
Assistant Examiner—Richard Hanig
Attorney, Agent, or Firm—Adrian D. Battison; Stanley G. Ade; Murray E. Thrift

[57] ABSTRACT

A method for detecting the angle of arrival at a receiver of ionizing radiation from a source of unknown specific activity at an unknown distance by using an active filter between the detector and source that varies the intensity of the radiation by a predetermine factor according to position and then comparing that value to an unshielded detector's value forming a geometric ratio to determine the angle of arrival of the radiation at the receiver in relation to a predetermined reference plane or line.

5 Claims, 6 Drawing Sheets

33

RADIATION DETECTOR DIRECTION

This application is a continuation of application Ser. No. 643,234, filed Jan. 22, 1991 and now abandoned.

BACKGROUND OF THE INVENTION

This invention relates to a method for detecting the angle of arrival of received radiation from a single source of radiation.

Sensors of radiation which have directional capability have previously been provided. Such sensors have applications when a single object is to be monitored at any one time. It is intended therefore that the invention can provide information concerning the position of one object relative to another or give a reading of the incident angle of received radiation with reference to a given line or plane through the receiver.

Prior art devices generally rely upon a rotating scanning arrangement which requires a continuous signal from the radiation source, and they have limited capability in the interpretation of signals of brief duration unless aimed towards the source at the time of transmission. Alternatively some devices rely upon collimation or directional windows in a fixed array or in a rotating device. The disadvantages of these devices are as follows:

a) the readings are stepped with gaps between successive steps;

b) the devices have limited capability to handle signals of brief duration;

c) wear associated with moving parts increases the potential for failure in service.

SUMMARY OF THE INVENTION

It is one object of the present invention, therefore, to provide an improved device and method for detecting the angle of arrival of radiation from a source of radiation remote from the receiver.

According to the invention, therefore, there is provided a method for detecting the angle of arrival at a receiver of radiation from a source of radiation remote from the receiver comprising providing at the receiver a detector responsive to said radiation, providing between the source and the detector a filter active upon the radiation to attenuate by a predetermined factor the intensity of radiation passing therethrough to the detector such that the detector provides an indication of a first intensity value, the filter being constructed such that the predetermined factor varies in dependance upon the position at which radiation reaching the detector passes through the filter on its path to the detector, obtaining information concerning the intensity of the radiation independently of said filter to provide a second or reference intensity value by a comparison of the two values to determine the angle of arrival at the receiver.

The device has the advantages therefore that it does not require any moving parts, that a continuous graduation of the predetermined factor provides a continuous range of readings of the instrument, and that it can accommodate intermittent, pulsed, or interrupted signals without aiming the receiver at the source.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
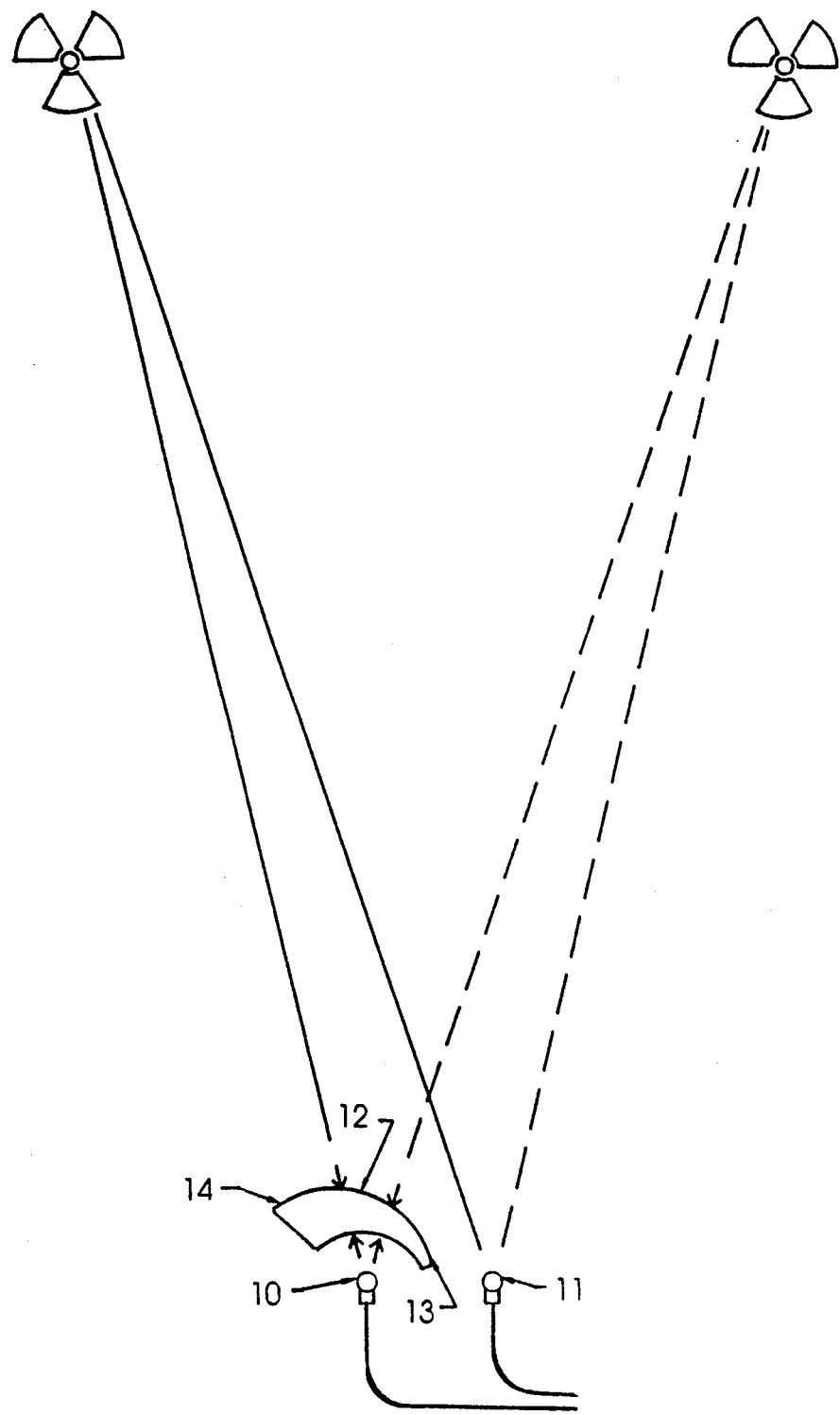
FIG. 1 is a simple schematic illustration of the relationship between the angle of arrival of radiation from different source positions, and the thickness of filtering material intervening in the path of the radiation before it strikes the detector.

The operation of the device is shown simply and schematically in FIG. 1 in which the receiver includes a first detector 10 and a second detector 11 together with a variable absorption filter 12. The filter is designed so that it provides a predetermined variation in the intensity of radiation passing therethrough which varies in dependance upon the position at which radiation incident upon the detector passes through the filter on its path to the detector. Thus simply in this embodiment the filter is wedge-shaped so that it presents to the incident radiation a thinner filtering effect at an end 13 of the filter and a thicker effect at the end 14 of the filter. Thus as shown in FIG. 1 when the source is moved, the amount of absorption of radiation by the filter decreases as the source is moved to the right and increases as the source is moved to the left as shown.

Most technical terms herein particularly those appearing in quotations, are defined according their usage in the field of penetrating ionizing radiation or are references in McGRAW-HILL DICTIONARY OF SCIENTIFIC AND TECHNICAL TERMS, 4th edition.

The terms "radiant energy" and "radiation" are used to describe;

a) electro-magnetic radiation b) ionizing radiation in the form of particles.

The radiation is assumed to be travelling in a fluid medium or in space, and the source of radiation is assumed to be of a small focal area compared to the distance from the source to the receiver resulting in a beam of essentially parallel radiation at the receiver. ("point source")

The word detector is used to describe Geiger-Mueller tube, ionization chamber, scintillator type detectors or other equivalent receivers for ionizing radiation such as microwaves, gamma rays, x-rays, alpha particles, beta particles, or neutrons.

In the text, the detector is assumed to be of a type sensitive to the radiation from the corresponding source and interference as well as the environmental background radiation are assumed to be negligible or stable at a fixed level. It is assumed that electrical amplification of the output from the detectors may be included in the circuitry of this invention be necessary, and that the output may be measured by voltmeter, ammeter or ratio meter, depending on the type of detector and whether a microprocessor is used to correlate the outputs.

The filter has several shapes useful for specific applications however there are two basic types, one type measures the theoretical angle between the "propagation path" and a reference plane through the receiver; "bearing" or "azimuth", while the other measures the angle between the propagation path and a line or axis through the receiver; "cone angle" or "zenith angle".

Figure 2:
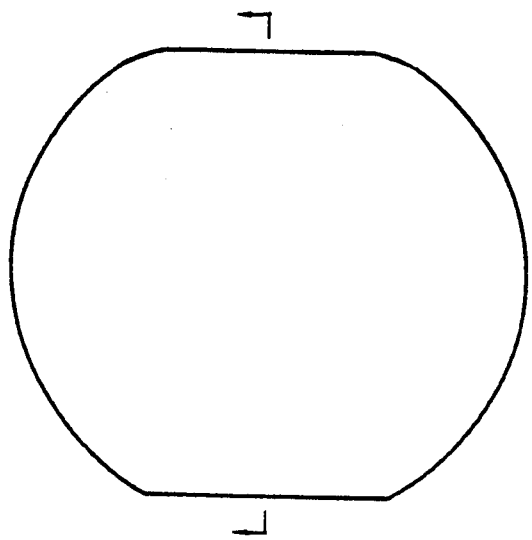
FIG. 2 is a view of the exterior of a filter and first detector according to a first aspect of the invention in which the cone angle of arriving radiation is determined.
Figure 3:
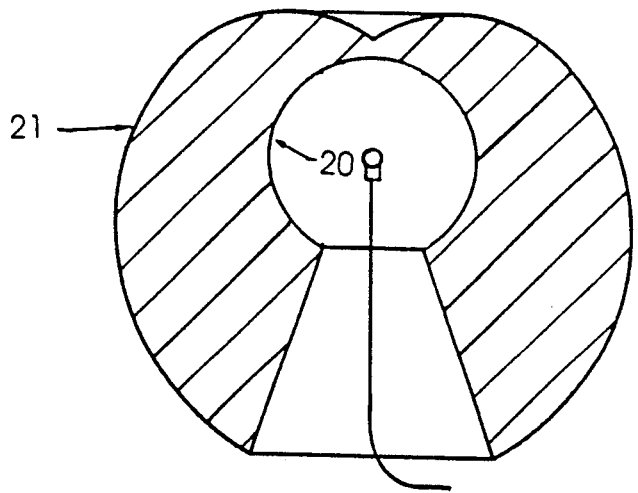
FIG. 3 is an elevation cross-sectional view of FIG. 2.
Figure 4:
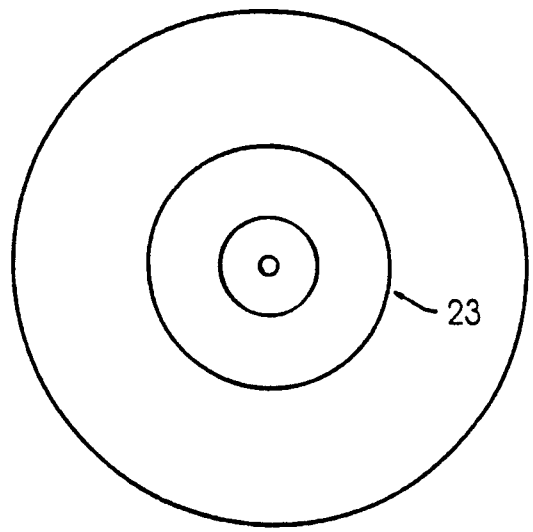
FIG. 4 is a bottom view of FIG. 2.
Figure 5A:
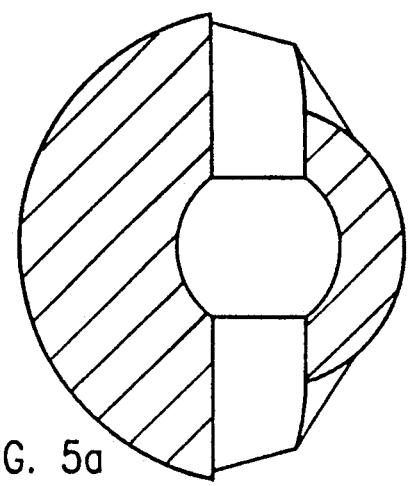
FIGS. 5a and 5c are elevation cross-sectional views of FIG. 5b.
Figure 5B:
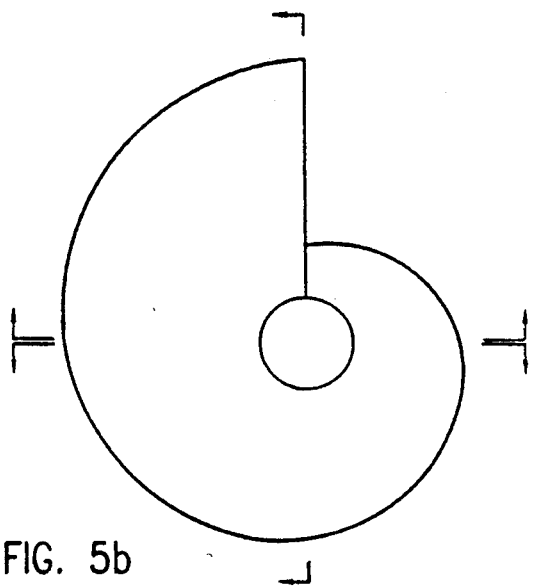
FIG. 5b is a view of the exterior of a filter and first detector according to a second aspect of the invention in which the bearing of arriving radiation is determined.
Figure 6:
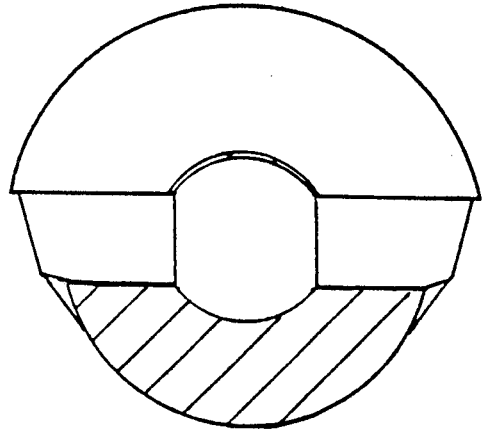
FIG. 6 is an elevation cross-sectional view of FIG. 5b.
Figure 5C:
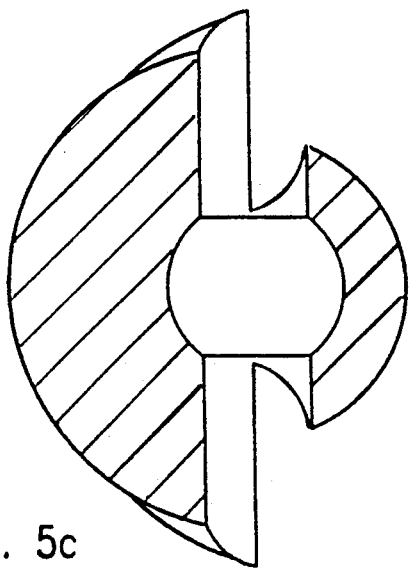
Figure 7:
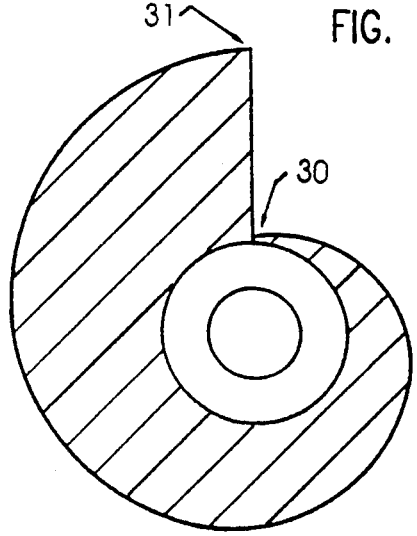
FIG. 7 is a plan cross-sectional view of FIG. 5 showing a plane through the centre of the filter perpendicular (normal) to the axis.

FIGS. 5, 6 and 7 show filters of the "bearing type" while FIGS. 2, 3 and 4 show filters of the "cone angle type".

It is assumed for the purposes of our description, that our reference "zero point" is North for the "bearing type" filter and the zenith for the "cone angle type" filter and that the filters are positioned accordingly before the taking of measurements.

It is recognized that certain detectors provide output pulses which cause inherent fluctuation in the intensity readings. The use of devices which average the readings, compensate for "deadtime", pulse counting devices or rate meters or other means which improve the accuracy or stability of certain detectors may be included in the circuitry of this invention.

It is recognized that the detectors must have characteristics which provide consistent readings independent of the angle of arrival in all directions over the range being monitored.

It is recognized that the separation of the reference detector from the attenuated detector by a few centimeters introduces the theoretical possibility of inaccurate readings when the source is at very close proximity to the receiver due to the slight difference in the detector-to-source distances. For typical applications, the reference detector and the filter-attenuated detector can be assumed to be equidistant from the source.

An instrument for measuring the angular displacement from a reference line or plane of the propagation path of radiant energy is comprised of a minimum of two similar detectors, sensitive to radiant energy and having a minimal sensitive surface area, each of which produces an electrical output corresponding to the intensity of the radiation. The reference detector is not enclosed or obstructed by any absorptive material. A nearby detector is enclosed so that an intensity-decreasing filter intervenes in the propagation path near the receiver. The filter is shaped to produce a continuous gradient of attenuation, as the "path angle" varies between the extremities of the range being monitored, and is composed of material which has adequate absorptive properties with minimal scatter (diffusion) or with controlled scatter, such that scattered radiation has a minimal influence on the measured intensity.

As shown in FIGS. 2, 3 and 4 the filter used to monitor "cone angle" is shaped such that the inner surface 20 is spherical and the outer surface 21 is shaped such that a cross-sectional view through the axis shows an arc of a spiral with the same centre as the inner surface and any cross-sectional view perpendicular to the axis shows the outer surface as a circle. A hole 23 typically located opposite the thinnest point of a cone-angle filter and centreed along the filter axis allows the detector centred in the filter to be electrically connected to external circuits. This filter continuously varies in thickness and hence intensity-decreasing property, throughout the range of possible cone angle measurements with the exception of the area where the electrical access hole is located. While there are many combinations of outer and inner surface which will produce similar attenuating properties, the thickness measured radially from the detector must diminish proportionally to the cone angle throughout the range monitored.

The reference detector and the filter-attenuated detector are each connected electrically to respective circuitry to amplify the output and maintain its proportionality to the received intensity at the respective detector. The ratio of these two outputs is then measured either directly by a ratio meter or by a computer. The value obtained represents the ratio of the intensities incident at said detectors. This value can be read on a meter as the path angle or can be multiplied by a constant to convert it to the path angle. The angular measurement represents the angle between the axis of the cone and the surface of the cone upon which the source lies.

Additional filter-attenuated detectors, with their axes divergent mounted in close proximity to one another in relation to the distance to the monitored source, may be used to fix the position of the source along a known line. Two cones will have two lines of intersection, however three cones will have only one line of intersection common to all three and this represents the propagation path.

Figure 10:
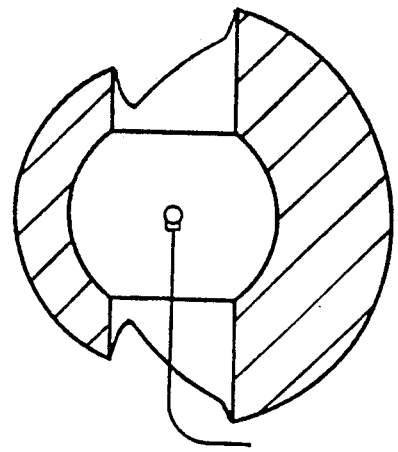
FIG. 10 is an elevation cross-sectional view of FIG. 9 at a plane containing the axis and illustrating the concentric circular appearance of the inner and outer surfaces as seen in any cross-section containing the axis.

Turning now to the second type of filter shown in FIGS. 5, 6 and 7 this device measures angles from a reference plane i.e. bearing. This type of filter can also have several optional inner/outer surface combinations however in a preferred embodiment, one surface would be spherical while the other would be spiral in any cross-sectional plan view such that the thickness in a radial direction from the detector, and hence the intensity at the detector varies continuously and proportionally from 0° to 359°, and it also is accurate when the source position is above or below the horizontal plane through the instrument. This filter typically has access to the interior through holes located in the top and bottom along the axis of the filter. The design parameter of this type of filter is 1) the thickness measured radially from the detector must be the same for any given bearing, therefore a cross-sectional view at any vertical plane containing the vertical axis shows the inner and outer surface as arcs of circles having a common centre at the detector (see FIG. 10); and;

2) the radial thickness is equal to the bearing multiplied by a constant plus the thickness at 0°.

Figure 11:
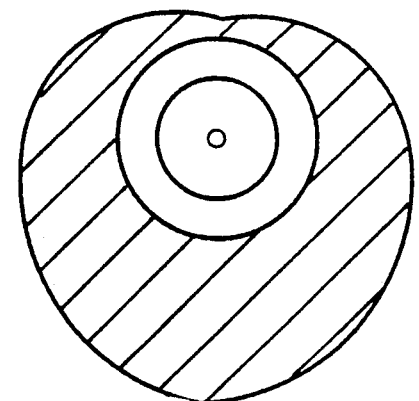
FIG. 11 is a plan cross-sectional view of FIG. 9 at a plane through the centre of the filter and perpendicular (normal) to the axis.

The thinnest point 30 corresponds to 0° while the thickest point 31 is at approximately 359°, (360° is used as the thickest point in all calculations). Alternatively there can be provided FIG. 9, 10 and 11 a filter with its thickest point 33 at 180°. A plane containing the vertical axis and the 0° and 180° bearing points would divide this filter into symmetrical halves. This filter would typically be used in conjunction with at least one other similar filter with the respective axes parallel but the zero or thinnest point oriented approximately 90° to each other. The advantage of this filter is that the sudden step in the thickness at the 0°/360° degree location is eliminated and thus any jump in the readings is also eliminated. A second advantage of using two or more bearing type filters with their thinnest points in different directions, is that failure to obtain a common bearing measurement from all detectors means that there is more than one source influencing the readings.

The following calculations demonstrate the theoretical basis for the conversion of the intensity measurement to the angular measurement considering, in this instance, a bearing type filter. The thickness "t" is measured between the inner and outer surfaces radially from the detector. The thickness of the filter material which reduces radiation to one half its original intensity is expressed as one HVL (half-value layer).

Tn=thickness at n degrees
T0=thickness at zero degrees
T360=thickness at 360 degrees The relationship between the thickness and the bearing is expressed by the equation;

$$Tn = T0 + [n]\frac{[T360 - T0]}{360}$$

when $T0 = O$ then $Tn = \frac{n(T_{360})}{360}$

Note: T360 and T0 are constants which depend on the design.

The following equation is used in barrier thickness calculations;

$$2^m = \frac{I0}{I} \text{ or } m = \frac{\log[I0 \div I]}{\log 2}$$

where
I0=original intensity
m=Tn/HVL=number of HVL $$\frac{T_{n'}}{HVL} = m \text{ or } T_{n'} = m(HVL)$$

The first equation can be solved for "n".

$$n = 360\left[\frac{m(HVL) - T_{0'}}{T_{360'} - T_{0'}}\right]$$

$$m = \frac{\log(I_0 \div I)}{\log 2}$$

$$n = 360\left\{\frac{[\log(I_0 \div I) \div \log 2](HVL) - T_{0'}}{T_{360'} - T_{0'}}\right\}$$

Figure 8:
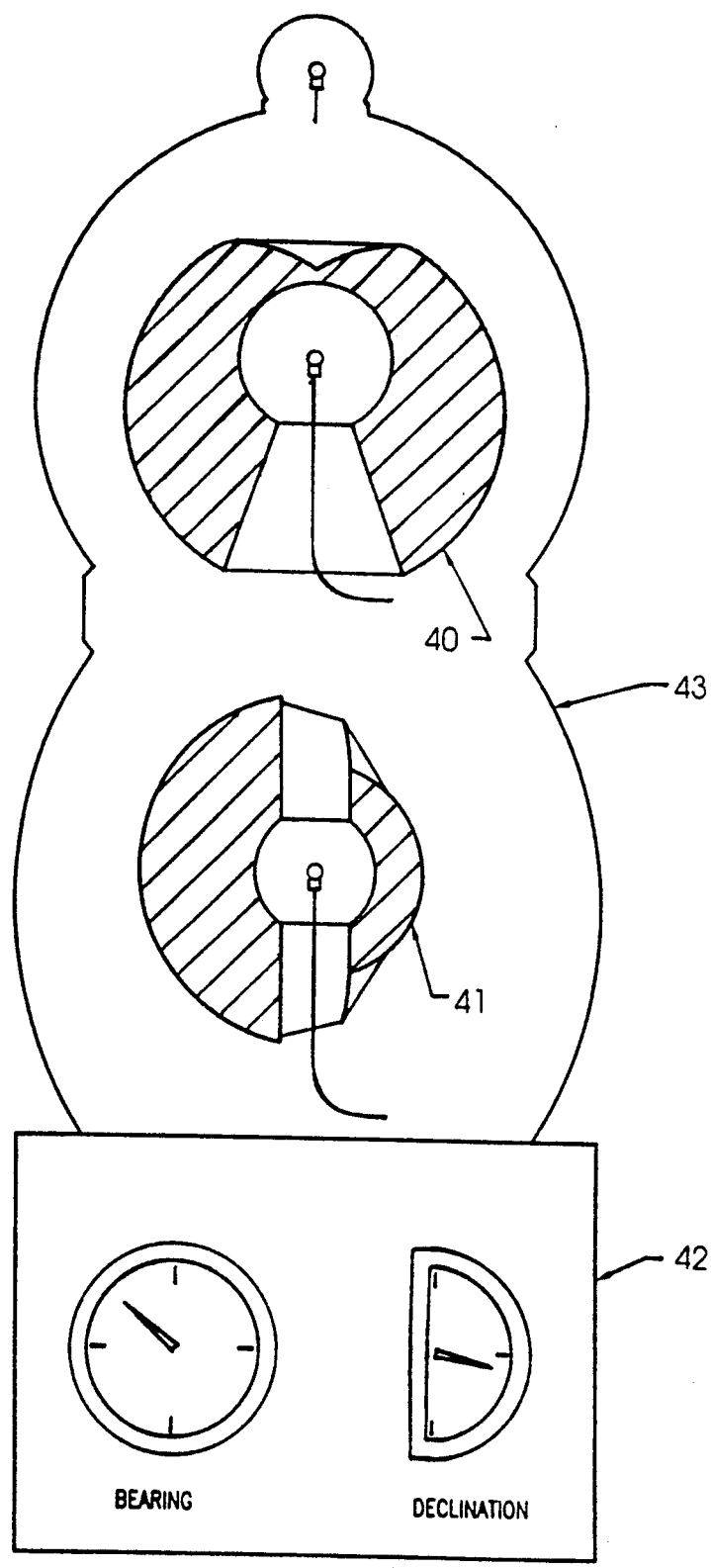
FIG. 8 is a schematic front elevational view of an instrument at a radiation monitoring station according to the present invention, showing the display panel and the upper weather protective cover broken to show an elevation cross-sectional view of the arrangement of detectors and filters necessary to obtain information on the spherical coordinates of the source of radiation.

Turning now to FIG. 8 there is shown a schematic front elevational view of an instrument at a radiation monitoring station with the part of the instrument above the display panel shown as a cross-sectional view through the middle of the weather protective cover and filters enclosed therein, as indicated at 43. The device includes a first sensor of the type shown in FIGS. 2, 3 and 4 indicated at 40 and a second sensor of the type shown in FIGS. 5, 6 and 7 indicated at 41. The device further includes electronic control section and meter system as indicated at 42. The mounting of the device including the arrangement that detects and filters is of the type necessary to obtain information on the spherical coordinates of the source of radiation.

Figure 9:
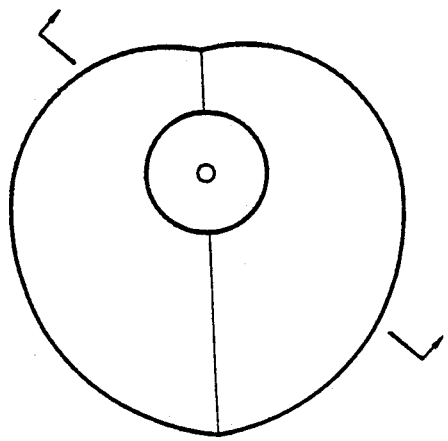
FIG. 9 is a plan view of a filter similar to that shown in FIG. 5b throughout a 180° arc while the 180° to 360° arc is symmetrical to the 0° to 180° arc about a vertical plane thereby capable of providing two possible bearing positions. The correct bearing of the two is determined by the usage of a second identical filter positioned at an angle to the first. Each filter will provide two readings, one of which is the actual bearing while the second reading is equivalent to the difference obtained by subtracting the first reading from 360 degrees. This arrangement of filters provides a method of determining if more than one source of radiation is affecting the readings.

In FIG. 9 is shown a plan view of a filter similar to that shown in FIG. 5b but modified so that it is symmetrical about a centre line passing through a point at 180° from the initial position.

Thus the cone angle filter includes a substantially spherical internal surface and an external surface which continuously increases in radius proportionally to the cone angle and which is substantially spiral with the detector positioned inside said inner surface. The centre of the sphere and the spiral are coincident with the detector location and lie on the central axis of the filter. The filter is symmetrical about its axis such that any cross sectional view in a plane perpendicular of the axis will show the inner and outer surfaces as concentric circles. The second filter is shaped such that the predetermined factor varies in dependence upon an increase in angle between the two planes. One of the planes is the reference plane and the other passes through the source of the radiation relatively intersect along the axis of the filter both of which are perpendicular to a plane perpendicular to the axis. The internal surface of the filter is substantially spherical and the external surface is shaped such that any cross sectional view in a plane perpendicular to the axis shows an external surface as an arc of a spiral with the polar equation R=A[theta] and shows the internal surface as a circle. Any cross sectional view in a plane containing the axis shows the inner and outer surfaces as arcs of concentric circles, adjacent to both filters having their axis in a vertical position, providing the location of a line coincident with the propagation path of the radiation by identifying two angular measurements corresponding to the orthogonal system of spherical coordinates which place the source of radiation along a directed line, the radius vector, passing through the receiver.

In FIG. 9 is shown a plan view of a filter similar to that shown in FIG. 5 but modified so that it is symmetrical about a centre line passing through a point at 180° from the initial position. As the device is symmetrical, it is capable of providing two possible bearing positions. The correct bearing of the two is determined by the usage of a second identical filter positioned at an angle to the first. Each filter will provide one correct reading which will then be obvious because this will be the same for both filters. This arrangement will warn when there is more than one source in the area since there will not be two matching readings. The device is further shown in FIGS. 10 and 11.

Figure 12:
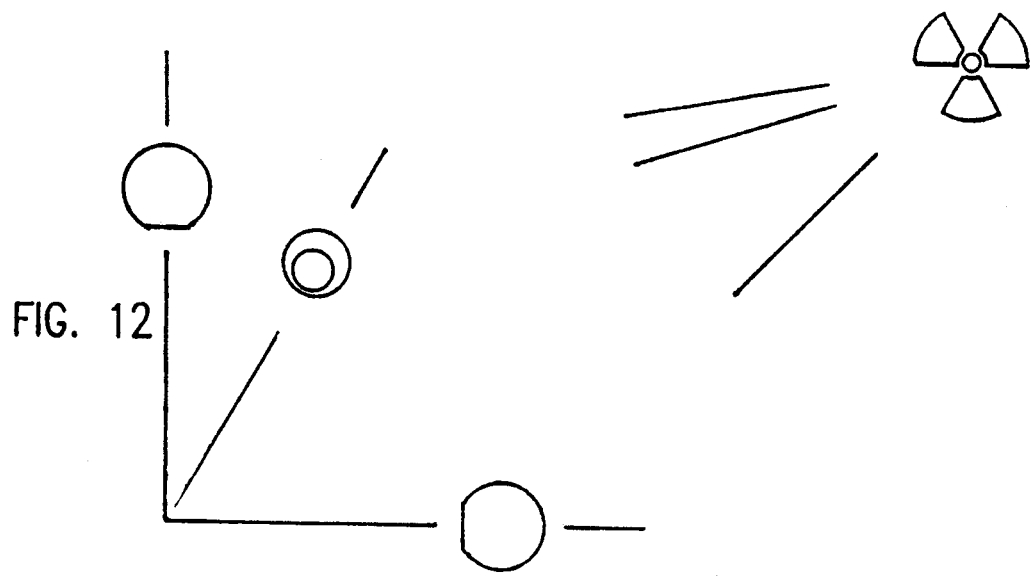
FIG. 12 is a view of a guidance device wherein there filters of the type shown in FIG. 2 are arranged with their axes on the positive x, y and z directions as defined in a conventional system of rectangular coordinates. When the intensity of the signal at all three filters is the same, the device is on course toward the source.

FIG. 12 is a view of a guidance device wherein three filters of the type shown in FIG. 2 are arranged with their axis on the positive X, Y and Z directions as defined in a conventional system of rectangular coordinates. When the intensity of the signal at all three filters is the same, the device is on course towards the source. Thus the three cone angle filters are positioned with their axes mutually perpendicular and electrical outputs from the three respective detectors are compared to guide or aim an instrument or vehicle toward a source of radiation. The outputs are only the same when the instrument or vehicle is aimed at or on course toward the source of radiation.

Figure 13:
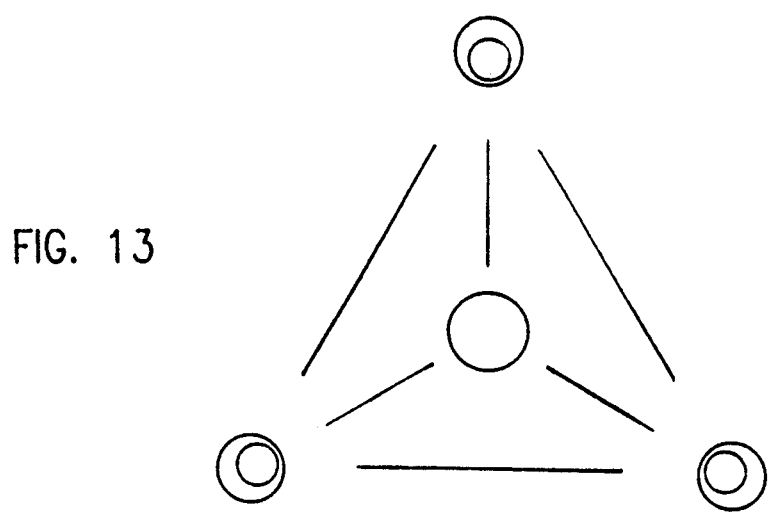
FIG. 13 is a plan view of a monitoring station wherein four filters of the type shown in FIG. 2 are arranged at the four vertices of a pyramid with three equilateral sides and an equilateral base. The axes are through the geometric centre of the pyramid. The reference intensity is monitored by four reference detectors, one for each of the four facets of the pyramid. The monitor determines the position of the source by correlating the readings of the three detectors at the vertices of the facet, with the reference reading from the respective reference detector. Only the three highest readings from the detectors with filters are analyzed while the fourth (lowest) reading is disregarded. Similarly only the highest single reading from the reference detectors is used in calculations while the lower readings are disregarded. The detectors are all shielded with radio-absorptive material on the side facing the centre of the monitoring station.
Figure 14:
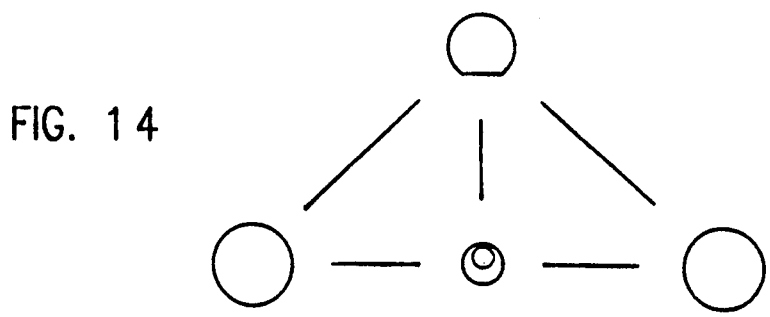
FIG. 14 is a front elevation view of FIG. 13.

In FIGS. 13 and 14 is a plan view and a front elevation view of a monitoring station wherein four filters of the type shown in FIG. 2 are arranged at the four vertices of a pyramid with three equilateral sides and an equilateral base. The reference intensity is monitored by the four reference detectors one for each of the four facets of the pyramid. The monitor determines the position of the source by correlating the readings of the three filter-attenuated detectors at the vertices of the facet with a reference reading from the respective reference detector. Only the three highest readings from the detectors with filters are analyzed while the fourth (lowest) is disregarded. Similarly only the high single reading from the reference detectors is used in calculations while the lower readings are disregarded. The detectors are all shielded with radio absorptive material (not shown) on the side facing the centre of the monitoring station. The four cone angle filters are positioned such that the six imaginary lines joining them outline the pyramid, the axes of the four filters converging at the geometric centre of the pyramid and the thinnest point of each filter pointing outward. This provides complete monitoring in all directions. The three filter attenuated detectors recording the highest intensities are automatically compared to the reference intensity from the reference detector recording the highest intensity by computer giving three cone angles each angle corresponding to a cone defined by a known vertex, axis and cone angle. Since the vertices of the cone are coincident with the enclosed detectors and are located in close proximity to the point of convergence of the axes the three cones have one common line of intersection which represents the path of the radiation.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for detecting the angle of arrival at a receiver of ionizing radiation from a source of unknown specific activity at unknown distance from the receiver comprising providing at the receiver a detector responsive to said ionizing radiation, providing between the source and the detector a filter active upon the radiation to vary by a predetermined factor the intensity of radiation passing therethrough to the detector such that the detector provides an indication of a first intensity value, the filter being constructed such that the factor varies in dependence upon the position at which radiation incident upon the detector passes through the filter on its path to the detector, obtaining information concerning the intensity of the radiation independently by means of a second detector separate from said filter such that the radiation impinges upon said second detector without passing through said filter to provide a second intensity value and such that the second intensity value of radiation detected by the second detector is independent of the angle of arrival of the radiation and comparing said first and second intensity values as a geometric ratio to determine the angle of arrival of the radiation at the receiver in relation to a predetermined reference plane or line.

2. A method according to claim 1 wherein the filter is shaped such that intensity of the radiation passing threrethrough varies in accordance with a predetermined factor from a first position 'theta'=0 (spherical coordinates) through an increasing angle from a central axis such that all positions lying upon a cone with its axis co-axial with the axis of the filter and its vertex coincident with the detector location therein, have the same factor.

3. A method according to claim 1 wherein the filter is shaped such that the intensity of the radiation passing therethrough varies in accordance with a predetermined factor from a first position 'phi'=0 (spherical coordinates) through an increasing angle up to 180 degrees and varies in the same way on the opposite side of the filter between 360 degrees to 180 degrees providing a filter with its thickest point at 180 degrees symmetrical about a plane through the 0 and 180 degree positions and containing the axis.

4. A method for detecting the angle of arrival at a receiver of ionizing radiation from a source of unknown specific activity at unknown distance from the receiver comprising providing at the receiver a detector responsive to said ionizing radiation, providing between the source and the detector a filter active upon the radiation to vary by a predetermined factor the intensity of radiation passing therethrough to the detector such that the detector provides an indication of a first intensity value, the filter being constructed such that the factor varies in dependence upon the position at which radiation incident upon the detector passes through the filter on its path to the detector, obtaining information concerning the intensity of the radiation independently by means of a second detector separate from said filter such that the radiation impinges upon said second detector without passing through said filter to provide a second intensity value and such that the second intensity value of radiation detected by the second detector is independent of the angle of arrival of the radiation and comparing said first and second intensity values as a geometric ratio to determine the angle of arrival of the radiation at the receiver in relation to a predetermined reference plane or line, wherein the filter is shaped such that the intensity of the radiation passing therethrough varies in accordance with a predetermined factor from a first position 'phi'=0 (spherical coordinates) through an increasing angle up to 360 degrees from said first position around a central axis.

5. A method for detecting the angle of arrival at a receiver of ionizing radiation from a source of unknown specific activity at unknown distance from the receiver comprising providing at the receiver a detector responsive to said ionizing radiation, providing between the source and the detector a filter active upon the radiation to vary by a predetermined factor the intensity of radiation passing therethrough to the detector such that the detector provides an indication of a first intensity value, the filter being constructed such that the factor varies in dependence upon the position at which radiation incident upon the detector passes through the filter on its path to the detector, obtaining information concerning the intensity of the radiation independently by means of a second detector separate from said filter such that the radiation impinges upon said second detector without passing through said filter to provide a second intensity value and such that the second intensity value of radiation detected by the second detector is independent of the angle of arrival of the radiation and comparing said first and second intensity values as a geometric ratio to determine the angle of arrival of the radiation at the receiver in relation to a predetermined reference plane or line, wherein the filter comprises a cone angle filter including a substantially spherical internal surface and an external surface which increases in radius proportionally to the "cone angle" and which is substantially spiral in shape with the detector positioned inside said inner surface, the centre of the sphere coincident with the detector location and lying on the central axis of the filter, and the filter being symmetrical about its axis such that any cross sectional view in a plane perpendicular to the axis will show the inner and outer surfaces as concentric circles and a second filter shaped such that the predetermined factor varies in dependence upon an increase in angle between two planes, one of which is the reference plane, and the other passing through the source of radiation, both of which intersect along the axis of the filter and both of which are perpendicular to a plane perpendicular to the axis, the internal surface of the filter being substantially spherical and the external surface being shaped such that any cross sectional view in a plane perpendicular to the axis shows the external surface as an arc of a spiral with the polar equation $r = a\,\theta$ and the internal surface as a circle, and any cross sectional view in a plane containing the axis shows the inner and outer surfaces as arcs of concentric circles, adjacent to both filters having their axis in the vertical position, providing the location of a line coincident with the propagation path of the radiation by identifying two angular measurements corresponding to the orthogonal system of spherical co-ordinates, which place the source of radiation along a directed line, the radius vector, passing through the receiver.

* * * * *